United States Patent
Spaeth

(10) Patent No.: US 11,875,963 B2
(45) Date of Patent: Jan. 16, 2024

(54) DEVICE FOR CONNECTING TO A HIGH-VOLTAGE GRID

(71) Applicant: Siemens Aktiengesellschaft, Munich (DE)

(72) Inventor: Matthias Spaeth, Neumarkt i. d. OPf. (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/787,643

(22) PCT Filed: Dec. 19, 2019

(86) PCT No.: PCT/EP2019/086315
§ 371 (c)(1),
(2) Date: Jun. 21, 2022

(87) PCT Pub. No.: WO2021/121598
PCT Pub. Date: Jun. 24, 2021

(65) Prior Publication Data
US 2022/0415585 A1    Dec. 29, 2022

(51) Int. Cl.
*H01H 9/00*    (2006.01)
(52) U.S. Cl.
CPC ................. *H01H 9/0005* (2013.01)
(58) Field of Classification Search
CPC ........ H01H 9/0005; Y02E 40/50; H01F 29/04
USPC ......................................................... 307/113
See application file for complete search history.

(56) References Cited

U.S. PATENT DOCUMENTS 3,553,395 A * 1/1971 White ..................... H01H 3/30
                                                           200/18
4,081,741 A    3/1978 Palmer

FOREIGN PATENT DOCUMENTS

DE         2002054 A1    7/1970
DE    102009048813 A1    4/2011

* cited by examiner

*Primary Examiner* — Rexford N Barnie
*Assistant Examiner* — Xuan Ly
(74) *Attorney, Agent, or Firm* — Laurence A. Greenberg; Werner H. Stemer; Ralph E. Locher

(57) ABSTRACT

A device for connecting to a high-voltage grid carrying an AC voltage and having a plurality of phases, includes an active part having at least one phase connection for connecting to a phase of the high-voltage grid, at least one step winding connected downstream of one of the phase connections and having a plurality of taps, a tap changer having, for each step winding, a selector for currentlessly switching over from a current to a desired tap of the step winding, and a load changeover switch connected downstream of the selector in series for commutating the current from the current to the desired tap, for avoiding a high short-circuit current in the step winding or in the tap changer. An impedance unit, having an impedance to be switched between a low impedance and a high impedance, is disposed between each selector and each load changeover switch.

4 Claims, 2 Drawing Sheets

DEVICE FOR CONNECTING TO A HIGH-VOLTAGE GRID

FIELD AND BACKGROUND OF THE INVENTION

The invention relates to a device for connection to a high-voltage grid carrying an AC voltage and having a plurality of phases. The device is equipped with an active part that has at least one phase connection for connection to a phase of the high-voltage grid, at least one step winding connected downstream of one of the phase connections and having a plurality of taps and a tap changer that has, for each step winding, a selector for the current-free changeover from a current tap to a desired tap of the step winding and a load changeover switch connected in series downstream of the selector for switching the current from the current tap to the desired tap.

Such a device is known from practice. For example, devices for the transmission and distribution of electric power are thus designed such that they are able to be connected to a supply grid that is at a high voltage potential. Due to the high voltages, losses during transmission are able to be minimized. For this reason, high-voltage grids are operated at voltages between 50 kV and 1200 kV. Examples of electrical energy transmission devices that are connected to high-voltage grids are switches, chokes and transformers.

Transformers are used for voltage conversion. They generally have, for each phase of the high-voltage grid, a pair of windings that are often referred to as primary and secondary winding. In order to adjust the voltage or impedance, transformers are equipped with what is known as a tap changer that creates contact between taps of a step winding. In this case, the step winding is connected in series with the primary and/or secondary winding, wherein the step winding is connected to the low-voltage end of the respective main winding, that is to say the primary or secondary winding. By virtue of selecting the tap of the step winding using the tap changer, it is possible to change the number of windings connected in series on the primary or secondary side and thus to vary the ratio between input and output voltage as desired.

In the case of such a transformer having a tap changer, in particular having an on-load tap changer (OLTC), a fault or an overvoltage in the tap changer or in the step winding may lead to a short circuit between two steps or taps. In general, this results in a very large short-circuit current through a part of the step winding that far exceeds the current in the case of an external short circuit. In most cases, this leads to the complete destruction of the tap changer and, under some circumstances, of the transformer, with considerable danger caused for example by fire, parts flying around or oil spraying out.

In particular in the field of power transformers, there is not yet any known technique that curbs or at least minimizes the fault or the consequences of a fault. Nowadays, conventional systems (for example differential protection) require at least 40 ms or more until the associated circuit breaker deactivates the transformer and thus disconnects it from the high-voltage grid. However, in this time, the greatest amount of damage has already occurred.

SUMMARY OF THE INVENTION

The object of the invention is therefore to provide a device of the type mentioned at the outset by way of which short-circuit currents in the tap changer or in a section of the step winding are able to be limited.

The invention achieves this object in that an impedance unit is arranged between each selector and each load changeover switch, the impedance of which is able to be switched between a low impedance and a high impedance.

According to the invention, the tap changer is equipped with an impedance unit that is arranged in the current path between each selector and the load changeover switch connected in series with this selector. The tap changer according to the invention preferably has at least two selectors and at least two load changeover switches, wherein a respective load changeover switch is connected in series with each selector. In other words, the tap changer forms multiple pairs of selectors and load changeover switches that are connected to one another in series. Each step winding has a pair of the tap changer consisting of selector and load changeover switch. A component of an impedance unit is arranged in each current path between selector and load changeover switch, the impedance of which, or in other words the AC resistance of which, is able to be changed between two states, or in other words switched. During normal operation, the impedance unit has a low impedance, meaning that a low-resistance current path is provided between each selector and each load changeover switch. In the event of a fault, the impedance is put into the second state, for example actively by an external control signal, in which the impedance unit provides a high impedance, such that a short-circuit current in the tap changer and/or the step winding is limited. Damage is thus able to be avoided before the transformer is removed from the grid by an external circuit breaker that is arranged between each phase connection of the device according to the invention and the high-voltage grid.

Advantageously, the impedance unit is able to be changed passively. In other words, in this embodiment, the device according to the invention itself ensures that the impedance unit is put, from a normal operating state in which it has a low impedance, into a limiting state in which it ensures a high impedance in the current path between selector and load changeover switch of the tap changer.

Advantageously, the active part for each phase has at least one main winding that is connected to one of the step windings at its end remote from the phase connection. Each selector has a first selector contact part for connection to the current tap and a second selector contact part for connection to the desired tap, wherein each load changeover switch has a first load changeover switch contact A that is galvanically connected to the first selector contact part, a second load changeover switch contact B that is galvanically connected to the second selector contact part and a moving part that makes contact with the first load changeover switch contact A in a first switch position of the tap changer and with the second load changeover switch contact B of the load changeover switch in a second switch position. In this case, the impedance unit comprises a first and second component, wherein the first component is connected to the first selector contact part of each selector and the first load changeover switch contact A of each load changeover switch and the second component is connected to the second selector contact part of each selector and the second load changeover switch contact B of each load changeover switch, such that a current flow through one or the other component is enabled depending on the switch position.

According to this development, the active part for each phase has at least one main winding that is connected to one of the step windings at its end remote from the phase connection. Each step winding is connected to a pair consisting of selector and load changeover switch. Each selector therefore has a first and second selector contact part, wherein each load changeover switch has a first and second load changeover switch contact. In the case of a pair consisting of selector and load changeover switch that is assigned to a step winding, the first selector contact part is galvanically connected to the first load changeover switch contact and each second selector contact part is galvanically connected to the second load changeover switch contact. The impedance unit in this case has a first and second component, wherein each component of the impedance unit is connected to each selector and each load changeover switch.

What is essential here is that a component of the impedance unit is connected to the contacts, each carrying current, of all selectors and load changeover switches. In the context of the invention, the current is thus carried, in a first switching state of the tap changer, through one component of the impedance unit, whereas respective other components remain current-free. The first component is thus for example connected to the first selector contact part and the first load changeover switch contact of the first pair of the tap changer and to the first selector contact part and the first load changeover switch contact of the second pair. During operation of the device, the first selector contact part bears on the current-carrying tap of the step winding. A moving part of the tap changer is in contact with each first load changeover switch contact. During normal operation, in each pair consisting of selector and load changeover switch, the current thus flows through the first selector contact part and the first load changeover switch contact. All of the currents are carried through the first component of the impedance unit.

If another tap is to be selected, the selector is actuated such that the second selector contact part is put in contact with the desired tap of the step winding. This takes place in a current-free manner, since the series-connected second load changeover switch contact does not make contact with the moving part of the tap changer. If the moving part of each load changeover switch is put in contact with the second load changeover switch contact, the current switches to each second selector contact part and each second load changeover switch contact. The second component of the impedance unit is connected to these contacts. In other words, the current then flows exclusively through the second component of the impedance unit. Each component is designed such that the currents flowing symmetrically through it ensure that the impedance of the component is very small and roughly zero. If one of the currents flowing through the component however increases significantly, this ensures the desired high impedance of the component.

Advantageously, each component of the impedance unit for each phase of the device has an impedance winding, wherein the impedance windings of a component are inductively coupled to one another and interconnected with one another such that, in the event of a symmetric current flow through the phases of the device, the reactances of the impedance windings of a component compensate for one another, such that the respective component has a lower resultant impedance value.

In this development of the invention, each component of the impedance unit has a plurality of impedance windings that are inductively coupled to one another. The number of impedance windings corresponds to the number of phases of the device.

In one different variant of the device according to the invention, the device is of single-phase design and has two symmetric current paths, wherein at least one main winding of the active part is arranged in each current path and has a high-voltage end that is connected to the phase connection and a low-voltage end that is connected to a step winding, wherein each component of the impedance unit has two impedance windings coupled inductively to one another, wherein one of the impedance windings is connected to the selector and the load changeover switch of the first step winding and the other impedance winding is connected to the selector and the load changeover switch of the second step winding and interconnected such that, in the event of a symmetric current flow through both current paths, the reactances of the impedance windings of a component compensate for one another, such that the respective component has a low impedance.

In this embodiment of the invention, the device is of single-phase design, but forms two symmetric current paths. At least one main winding of the active part is arranged in each current path. A step winding is connected in series with each main winding.

Further expedient embodiments and advantages of the invention are the subject of the following description of exemplary embodiments of the invention with reference to the figures of the drawing, with the same reference signs indicating functionally identical components.

DETAILED DESCRIPTION OF THE INVENTION

Figure 1:
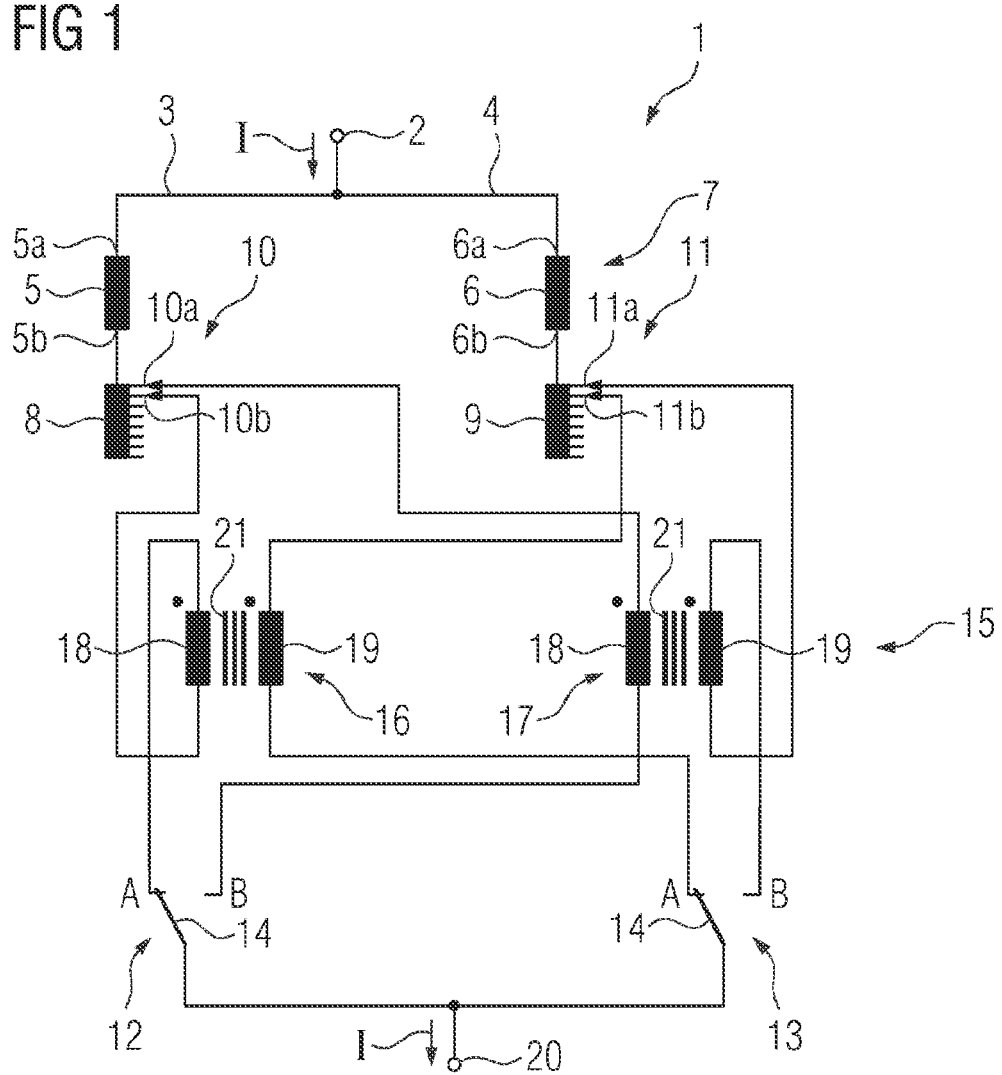
FIG. 1 schematically illustrates one exemplary embodiment of the device according to the invention and FIG. 2 schematically illustrates a further exemplary embodiment of the device according to the invention.

FIG. 1 shows one exemplary embodiment of the device 1 according to the invention, having a phase connection 2 that is able to be connected to a phase of a high-voltage grid carrying an AC voltage. The capital letter I illustrates the phase current that flows, in the exemplary embodiment shown in FIG. 1, from the phase connection 2 to a ground connection illustrated further below.

The device 1 has two symmetrically designed current paths 3 and 4, wherein a main winding 5 or 6 of an active part 7 is arranged in each current path. Each main winding 5, 6 has a high-voltage end 5a, 6a that is connected to the phase connection 2. Each main winding 5 or 6 furthermore has a low-voltage end 5b, 6b that is connected to a step winding 8 or 9. Each step winding 8, 9 is equipped with taps represented by short dashes. In this case, each step winding 8 or 9 is assigned a selector 10 or 11 of a tap changer, wherein each selector 10, 11 has a first selector contact part 10a, 11a for connection to a current tap and a second selector contact part 10b, 11b that is able to be put in contact with the next desired tap.

Each selector is assigned a load changeover switch 12 or 13, wherein each load changeover switch has two load changeover switch contacts A and B. In the position shown, a moving part in the form of a switching blade 14 of the respective load changeover switch 12, 13 is connected to the first load changeover switch contact A. The same applies accordingly to the switching blade 14 of the load changeover switch 13. An impedance unit 15 is arranged in the current path between each selector 10, 11 and the associated load changeover switch 12, 13. The impedance unit 15 comprises a first component 16 and a second component 17.

The component 16 of the impedance unit 15 has a first impedance winding 18 that is connected to the second selector contact part 10b of the selector 10 and the first load changeover switch contact A of the load changeover switch 12. The second impedance winding 19 of the component 16 is on the other hand connected to the second selector contact part 10b of the selector 11 and the first load changeover switch contact A of the load changeover switch 13 of the second step winding 9. This applies accordingly to the second component 17, the impedance windings 18, 19 of which are connected to the first selector contact part of the selector 10 or 11. They are also connected to each second load changeover switch contact B of the load changeover switches 12 and 13. Each component 16, 17 is thus connected to all of the selectors and all of the load changeover switches. Depending on the switching position of the tap changer, the current therefore flows through the impedance windings of the components 16 or 17.

The first current path 3 thus comprises the main winding 5, the step winding 8, a first impedance winding 18 of the first component 16, the load changeover switch contact A of the first load changeover switch 12 and finally the ground connection 20. The second current path 4 leads through the main winding 6, the step winding 9, the selector 11, the second impedance winding 19 of the first component 16 and the load changeover switch contact A of the second load changeover switch 13. The same current is thus carried through the windings 18, 19 of the first component. The windings 18, 19 are in this case wound counter to one another, this being intended to be illustrated by the opposing interconnection and the point shown above the windings. The inductive coupling of the first and second winding 18, 19 is achieved using an iron core 21, this being illustrated only schematically.

Due to the symmetric current flow and the inductive coupling, the first component 16, during normal operation, has an impedance of zero, such that no losses occur during normal operation. In the event of a fault, that is to say for example in the event of a short circuit of the step winding, a larger current flows through the first impedance winding 18 of the first component 16 than through its second impedance winding 19. The impedance windings thus no longer compensate for one another. An impedance is formed between the step winding 8 and the load changeover switch 12, such that the short-circuit current is limited and measures may be taken before irreparable damage to the device 1 occurs.

If the switching blades 14 of the load changeover switches are switched onto the load changeover switch contact B, there is a current flow just through the component 17 of the impedance unit 15, which is designed in the same way as the component 16. It takes on the same role that has been explained in connection with the first component 16.

Figure 2:
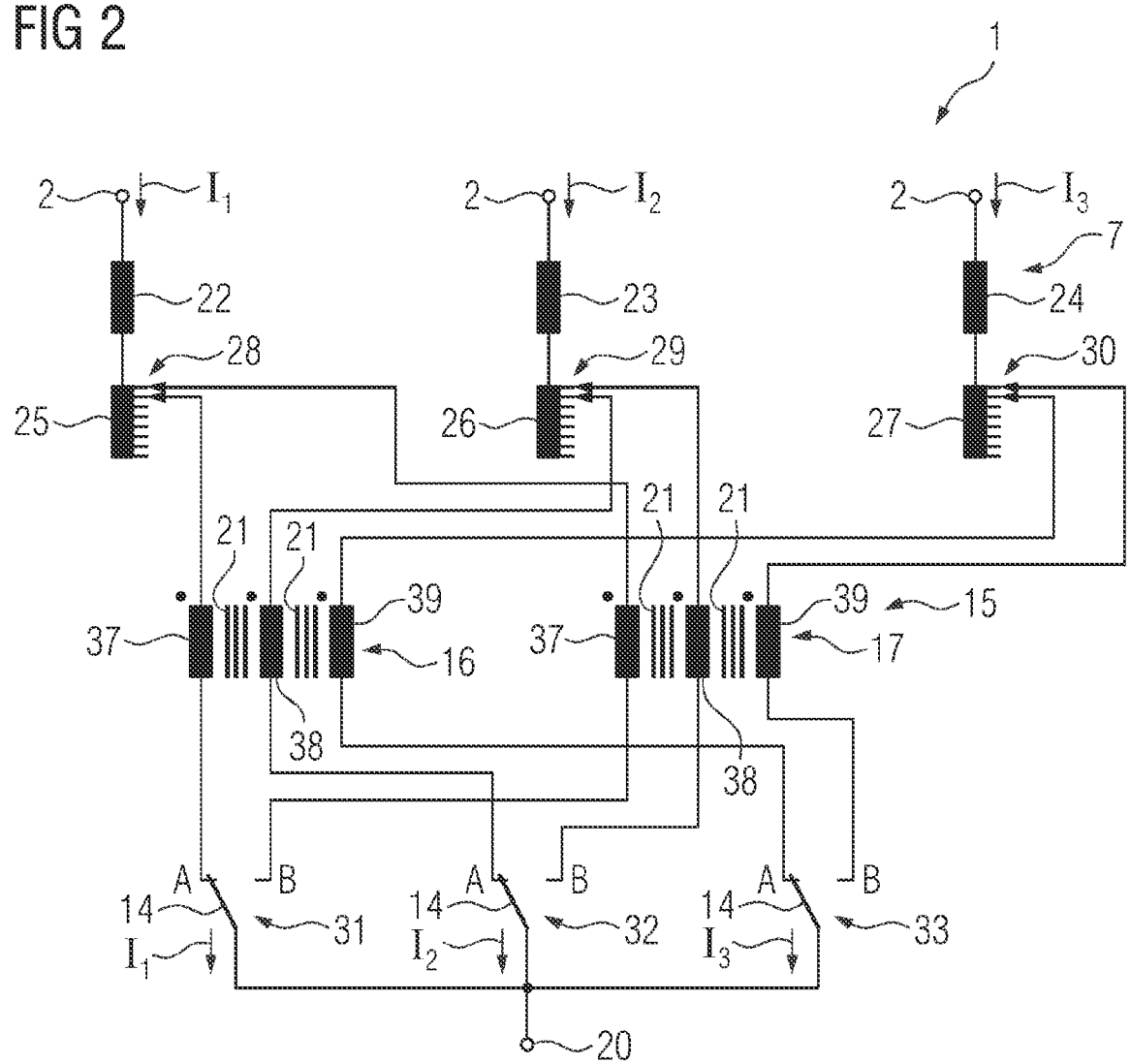

FIG. 2 shows a further exemplary embodiment of the device 1 according to the invention, which, in contrast to the exemplary embodiment shown in FIG. 1, is of three-phase design. It has three phase connections 2, through each of which a current I1 or I2 or I3 flows. The active part 7 has a main winding 22, 23, 24 for each phase, which is connected to the phase connection 2 at its high-voltage end 22a and to a step winding 25, 26, 27 at its low-voltage end 5b. Each main winding 25, 26, 27 is inductively coupled to a secondary winding arranged concentrically with respect to the respective main winding, which secondary winding is arranged in the respective main winding and is therefore not illustrated in the figures. Each step winding 25, 26, 27 is again linked to a selector 28, 29, 30, wherein each selector 28, 29, 30 is connected in series with a load changeover switch 31, 32, 33. The load changeover switches 31, 32, 33 are switched synchronously, wherein each switching blade 14 is changed from a position in which the switching blade 14 makes contact with the first load changeover switch contact A to a second position in which the switching blade 14 bears on the second load changeover switch contact B. It is again possible to see an impedance unit 15 that has two components 16 and 17. Each component 16, 17 of the impedance unit 15 has a first impedance winding 37, a second impedance winding 38 and a third impedance winding 39, wherein each first impedance winding is connected to the selector 28 and the load changeover switch 31 of the first phase, each second winding is connected to the selector 29 and the load changeover switch 32 of the second phase and the third winding 39 is connected to the selector 30 and the load changeover switch 33 of the third phase.

If the moving contact, embodied as a switching blade 14, of each load changeover switch 31, 32, 33, as shown in FIG. 2, bears on the load changeover switch contact A, the currents of all of the phases are carried through the component 16 of the impedance unit 15. The three impedance windings 37, 38, 39, inductively coupled to one another, of the component 16 are interconnected with one another such that, in the event of a symmetric current flow through the phases, the impedances of the impedance windings cancel one another out. Overall, the component 16 thus has an impedance of close to zero in the event of a symmetric current flow.

In the event of a short circuit of one of the step windings 25, 26, 27, a far higher current flows through one of the windings 37, 38 or 39 than through the other two impedance windings, which ends the mutual compensation of the impedances and overall results in a very high impedance of the component 16. The components 16, 17 of the impedance unit 15 thus reduce the short-circuit current between the selectors 28, 29, 30 and the respective load changeover switch 31, 32, 33, such that appropriate measures for limiting faults or disconnecting the device 1 from the grid are able to be taken.

The invention claimed is:

1. A device for connection to a high-voltage grid carrying an AC voltage and having a plurality of phases, the device comprising:
at least one active part having at least one phase connection for connection to a phase of the high-voltage grid;
at least one step winding connected to said at least one phase connection and to said at least one active part, said at least one step winding having a plurality of taps;
tap changers each having a respective selector for each step winding for a current-free changeover from a current tap to a desired tap of said at least one step winding;
load changeover switches each connected in series downstream of a respective selector for switching a current from said current tap to said desired tap;
impedance units each disposed between a respective selector and a respective load changeover switch, said impedance units having an impedance to be changed between a relatively lower impedance and a relatively higher impedance;
said active part for each phase having at least one main winding with an end remote from said at least one phase connection, said end being connected to one of said step windings;

each of said selectors having a first selector contact part for connection to said current tap and a second selector contact part for connection to said desired tap;

each of said load changeover switches having a first load changeover switch contact galvanically connected to said second selector contact part, a first load changeover switch contact galvanically connected to said first selector contact part and a moving part making contact with said first load changeover switch contact in a first switch position of said tap changer and with said second load changeover switch contact of said load changeover switch in a second switch position; and said impedance units including first and second components, said first component being connected to said second selector contact part of each selector and said first load changeover switch contact of each load changeover switch and said second component being connected to said first selector contact part of each selector and said second load changeover switch contact of each load changeover switch, for enabling a current flow through one or another of said first or second components depending on a switch position of said tap changer.

2. The device according to claim 1, wherein said impedance units are configured to be changed passively.

3. The device according to claim 1, wherein:

each of said components of said impedance units for each phase has impedance windings; and said impedance windings of a component are inductively coupled to one another and interconnected with one another, causing reactances of said impedance windings of a component to compensate for one another in an event of a symmetrical current flow through the phases of the device, and said respective component to have a lower resultant impedance value.

4. The device according to claim 1, which further comprises:

a single-phase configuration of the device and two symmetrical current paths;

said at least one main winding of said at least one active part being disposed in each current path and having a high-voltage end connected to said phase connection and a low-voltage end connected to a step winding;

each component of said impedance units having two impedance windings coupled inductively to one another; and one of said impedance windings being connected to said selector and said load changeover switch of a first step winding and another impedance winding being connected to said selector and said load changeover switch of a second step winding and interconnected, causing reactances of said impedance windings of a component to compensate for one another in an event of a symmetrical current flow through both current paths, and said respective component to have a low impedance value.

* * * * *